United States Patent [19]

Evans et al.

[11] 4,035,553
[45] July 12, 1977

[54] SODIUM-SULFUR ELECTRIC BATTERIES WITH CERAMIC SPACER IN SULFUR COMPARTMENT

[75] Inventors: Leslie Samuel Evans, Upper Basildon; John Richard Harbar, Grove near Wantage, both of England

[73] Assignee: The Secretary of State for Industry in Her Britannic Majesty's Government of the United Kingdom of Great Britain and Northern Ireland, England

[21] Appl. No.: 702,726

[22] Filed: July 6, 1976

Related U.S. Application Data

[63] Continuation-in-part of Ser. No. 591,322, June 30, 1975.

[30] Foreign Application Priority Data

Dec. 30, 1975 United Kingdom ............ 53225/75

[51] Int. Cl.² .......................................... H01M 4/36
[52] U.S. Cl. ................................................. 429/104
[58] Field of Search .................... 429/104, 102, 103

[56] References Cited

U.S. PATENT DOCUMENTS

| | | | |
|---|---|---|---|
| 3,811,943 | 5/1974 | Minck et al. ...................... | 429/104 |
| 3,985,576 | 10/1976 | Lingscheit et al. ................ | 429/103 |

*Primary Examiner*—C. F. LeFevour
*Attorney, Agent, or Firm*—Larson, Taylor and Hinds

[57] ABSTRACT

A sodium-sulphur cell is provided having a ceramic spacer means disposed in the liquid sulphur compartment to provide a region substantially free from cathodic reactions. The spacer means is disposed adjacent to materials likely to be adversely affected by said cathodic reactions, such as glass seals used to join the solid electrolyte to a ceramic support member, or a metallic end cap provided to close the liquid sulphur compartment.

9 Claims, 3 Drawing Figures

SODIUM-SULFUR ELECTRIC BATTERIES WITH CERAMIC SPACER IN SULFUR COMPARTMENT

This application is a continuation-in-part of Ser. No. 591,322 filed June 30, 1975

BACKGROUND TO THE INVENTION

This invention relates to electric cells and batteries having liquid sodium as a liquid anode, liquid sulphur as the liquid cathode, and a solid electrolyte.

SUMMARY OF THE INVENTION

According to the present invention, there is provided an electric cell comprising a solid electrolyte which on one side partially bounds a compartment containing liquid sodium and on its other side partially bounds a compartment containing liquid sulphur impregnated in a conductive felt, and an electrode means extending along the liquid sulphur compartment in spaced relationship to said solid electrolyte, wherein the improvement comprises insulating spacer means disposed in the liquid sulphur compartment adjacent to the solid electrolyte, said spacer means being adapted to provide both a region of relatively high electrical resistance substantially free from electrochemical reactions between the solid electrolyte and the electrode means, and a region of the solid electrolyte through which relatively few sodium ions flow during recharge of the cell.

Desirably, the spacer means is shaped to provide a lengthened path around the periphery thereof to inhibit the migration of sodium polysulphide ions therearound during recharge of the cell.

Desirably, the spacer means is disposed in the liquid sulphur compartment adjacent to materials contiguous to the solid electrolyte and which might be adversely affected by sodium ions flowing through said contiguous solid electrolyte.

The spacer means may be disposed in the liquid sulphur compartment so that it is also adjacent to metallic components which might be corroded by said electrochemical reactions.

BRIEF EXPLANATION OF THE DRAWINGS

To enable the present invention to be more readily understood attention is directed by way of example only to the accompanying drawings, in which.

DETAILED DESCRIPTION OF THE INVENTION

Figure 1:
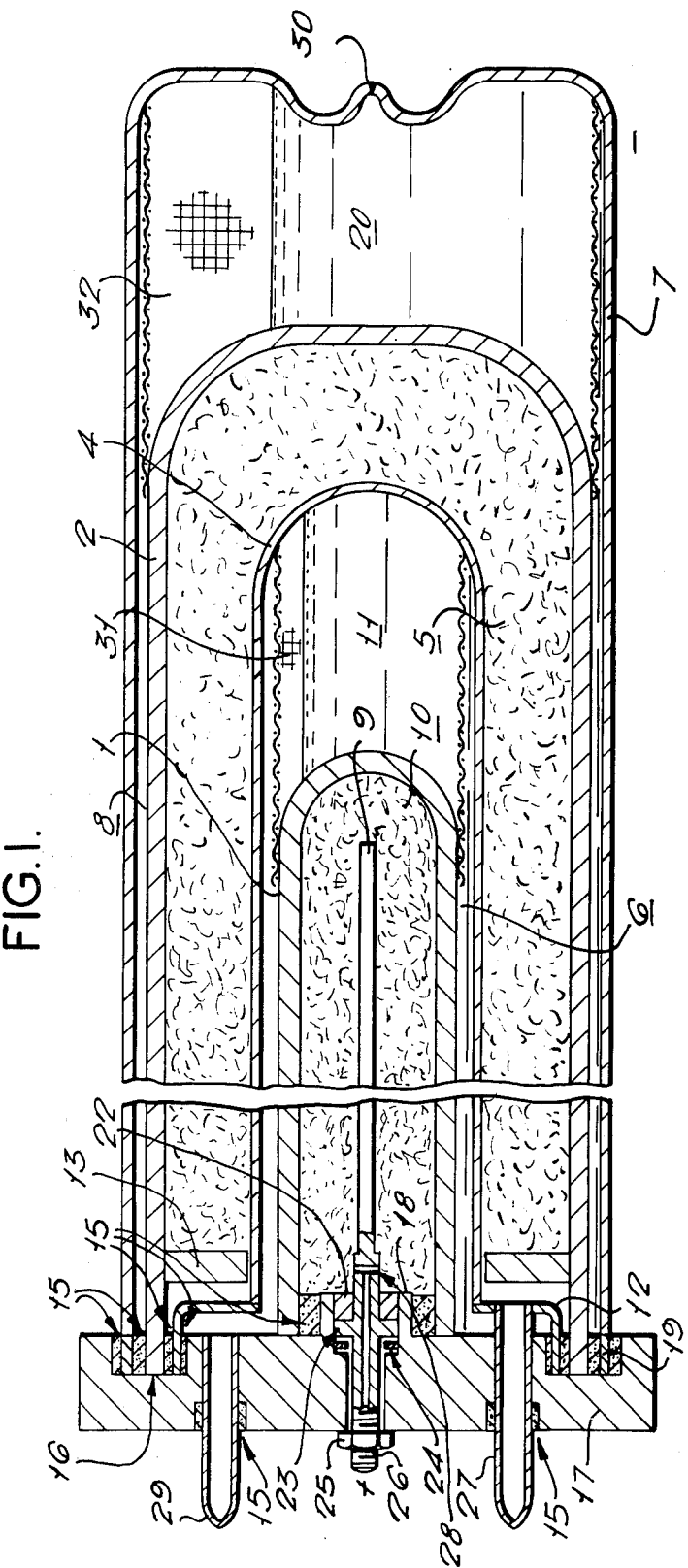
FIG. 1 is an axial sectional view of a battery having two electric cells separated by a bipolar electrode.

Referring now to FIG. 1, the battery shown is of circular form in section and comprises an inner tubular $\beta$-alumina solid electrolyte 1 disposed lengthwise and substantially concentrically within an outer tubular $\beta$-alumina solid electrolyte 2 to define a space therebetween in which a stainless steel (for example AISI316) tubular bipolar electrode 4 is disposed lengthwise and substantially concentrically to define sub-spaces 5 and 6. The outer solid electrolyte 2 is disposed lengthwise and substantially concentrically within a tubular metal casing 7, mainly of low alloy steel, to define a tubular space or gap 8 between the solid electrolyte 2 and the casing 7. The inner solid electrolyte 1, the outer solid electrolyte 2, the bipolar electrode 4, and the casing 7, are all closed at one end. A molybdenum current collecting rod 9 extends lengthwise and substantially concentrically into the space 10 inside the inner solid electrolyte 1. The battery is shown with its longitudinal axis disposed in a horizontal position but can operate in a vertical or intermediate position as well.

Liquid sodium is disposed in the sub-space 6 and the space 8. Graphite felt partially impregnated with liquid sulphur is disposed in the sub-space 5 and the space 10, thereby providing a suitable distributed voidage within the graphite felt to allow for expansion caused by the formation of polysulphides from the combination of sodium ions and sulphur when the battery discharges. The graphite felt also acts as a wick to constrain the liquid sulphur to "wet" the surfaces of the inner and outer solid electrolytes 1 and 2. The lengths of the inner solid electrolyte 1, the bipolar electrode 4, the outer solid electrolyte 2, and the casing 7, are such as to leave spaces 11 and 20 to act as reservoirs for liquid sodium. Stainless steel wire mesh wicks 31 and 32 in the spaces 11 and 20 constrain the liquid sodium to wet the ends of the solid electrolytes 1 and 2 by capillary action. The radial gaps between the inner solid electrolyte 1 and the bipolar electrode 4, and between the outer solid electrolyte 2 and the casing 7, are such as to constrain the liquid sodium by capillary action to wet the surfaces of the inner solid electrolyte 1 and the outer solid electrolyte 2, although the said gaps are shown as wide gaps in FIG. 1 for clarity.

In greater detail, the bipolar electrode 4 has a shouldered cylindrical portion 12 of "Kovar" nickel/iron alloy at its open end, butt welded to the main portion of the said electrode 4, which locates inside the outer solid electrolyte 2. The graphite felt in the sub-space 5 is capped with a loose fitting spacer means in the form of an $\alpha$-alumina annular plug-like spacer 13. The casing 7 at its open end has a short portion of Kovar nickel/iron alloy which is butt-welded to the main low alloy portion of the said casing 7. The portion 19, the solid electrolyte 2, and the bipolar electrode 4, are all located within an annular groove 16 in an end plate 17 of insulating material, for example $\alpha$-alumina, and are sealed thereto, and therebetween each other, with glass frit seals 15. The inner solid electrolyte 1 locates onto a spigot 18, which projects from the plate 17, and is sealed thereto with a glass frit seal 15. The graphite felt inside the space 10 in solid electrolyte 1 is capped with an $\alpha$-alumina annular spacer 22 which butts against one side of a flanged portion 23 of the rod 9. A "Grafoil" gasket 24 between the other side of the flanged portion 23 and the end plate 17 is compressed by a nut 25 on the threaded end 26 of the rod 9.

A Kovar nickel/iron alloy filling tube 27 projecting from the shouldered portion 12 of the bipolar electrode 4, and a Kovar nickel/iron alloy filling tube 29, extend through the end plate 17 and are sealed thereto by glass frit seals 15. A hole extends through the threaded end 26 of the rod 9 and leads to a transverse hole 28 within the space 10. The filling tube 29 terminates flush with the inside face of the end plate 17 at a position adjacent to the shouldered portion 12 of the bipolar electrode 4. A short tube 30 is recessed into the closed end of the casing 7. The tube 27, and the hole in the threaded end 26 are used to feed liquid sulphur into the sub-space 5 and the space 10 respectively. The tube 29 and the short tube 30 are used to feed liquid sodium into the sub-space 6 and the space 8. When the battery has been filled with liquid sulphur and liquid sodium, the said tubes 27, 29 and 30, and the threaded end 26 are sealed by crimping and welding. A negative terminal (not shown) is welded to the side of the casing 7, the positive terminal being provided by the threaded end 26.

The bipolar electrode 4 in effect separates two electric cells of the kind described and acts as a series connection between them. In operation, each of the said electric cells develops a potential difference, and because of the series connection provided by the bipolar electrode 4, the total potential difference developed across the battery will be equal to the sum of the said potential difference of each cell.

The Kovar nickel/iron portion 12 is provided to permit glass frit seals 15 to be used to join the bipolar electrode 4 to the end plate 17 since it has a controlled expansion. The spacer means in the form of the α-alumina spacer 13 in the liquid sulphur compartment is therefore provided to protect the Kovar nickel/iron portion 12 by keeping the graphite felt away from the Kovar nickel/iron portion 12 so that no corrosive electrochemical cathodic reactions can take place near it. The α-alumina spacer 13 additionally protects the region of the glass frit seal 15 by providing a region substantially free from electrochemical reactions and inhibiting the migration of sodium polysulphide ions therein, since the glass frit seal 15 is likely to be adversely affected and short circuit the cell if sodium ions are allowed to flow through a portion of the solid electrolyte 2 contiguous to the glass frit seal 15. The glass frit seal 15 may in such adverse circumstances become locally detached from the solid electrolyte 2, or crack as a result of the electric potential existing across it between the charged sodium polysulphide ions and the liquid sodium compartment causing sodium ions to track through it.

It has been found that many cases of cell failures have been due to the aforesaid failure of the glass seals. The distortion of the flow of sodium ions through the solid electrolyte brought about by the presence of the glass seal can lead to such a concentration of sodium ions at the surface of the solid electrolyte adjacent to the liquid sodium compartment that failure of the solid electrolyte occurs. For this reason it is important that the spacer means 13 should also extend beyond the extremities of the glass sealing means in the liquid sodium compartment.

Figure 2:
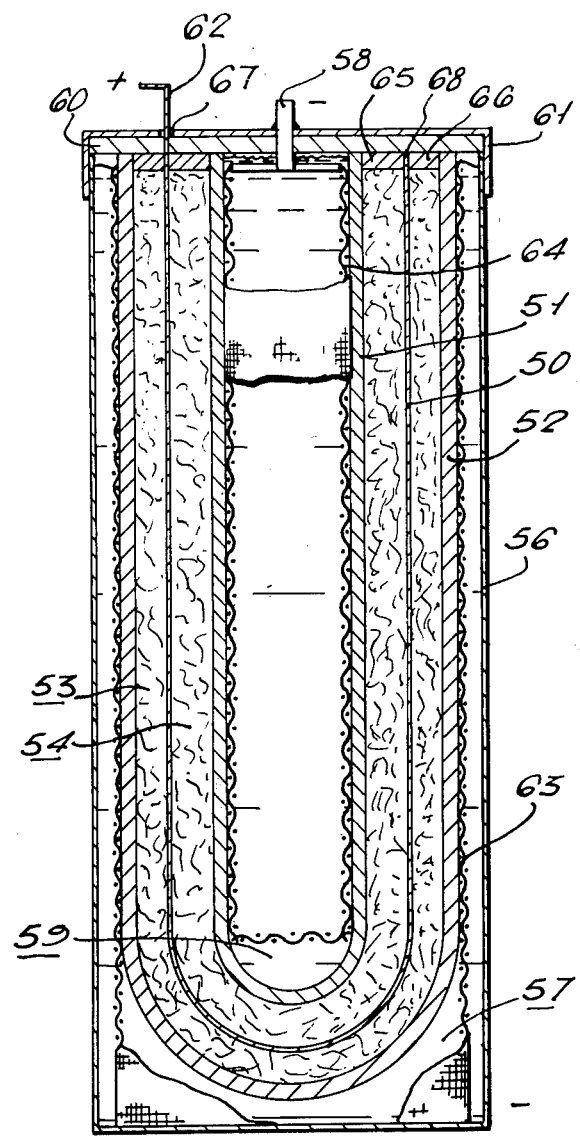
FIG. 2 is an axial sectional view of a battery having two electric cells separated by a terminal electrode.

Referring now to FIG. 2, the battery shown is of circular form in section, and generally follows the design principles, and uses the same materials as the battery shown in FIG. 1.

A stainless steel (for example AISI 316) tubular terminal electrode 50 with a Kovar nickel/iron alloy extension 68, is disposed between an inner tubular solid electrolyte 51 of β-alumina and an outer tubular solid electrolyte 52, also of β-alumina, to define sub-spaces 53 and 54 within which graphite felt partially impregnated with liquid sulphur is disposed, liquid sodium being disposed in the space 59 inside the inner solid electrolyte 51. The graphite felt in the sub-spaces 53 and 54 is capped with spacer means in the form of α-alumina spacers 65 and 66. The outer solid electrolyte 52 is disposed within a tubular mainly low alloy steel casing 56 to define a space 57 therebetween for liquid sodium. A stainless steel wick 63 is disposed in the space 57 contiguous to the outer solid electrolyte 52. A stainless steel wick 64 extends in the space 59 contiguous to the inside face of the inner solid electrolyte 51 and also acts as the negative electrode being connected to a Kovar nickel/iron alloy rod 58 which projects through an α-alumina disc 60 to provide a negative terminal 58. The rod 58, and the casing 56 which provides another negative terminal, are welded to a low alloy steel end cap 61. A projection 62 from the Kovar nickel/iron alloy extension 68, projecting through the disc 60, and the end cap 61, and insulated from the cap 61 by an insulating sleeve 67, provides the positive terminal. In effect the terminal electrode 50 separates two electric cells of the kind described, and provides a parallel connection between them so that in operation the current produced by the battery will be the sum of the currents produced by each electric cell.

The spacer means provided by the α-alumina spacers 65 and 66 perform the same function as the spacer 13 in FIG. 1 in providing a region free from cathodic electrochemical reactions to protect the Kovar nickel/iron extension 68 and the glass seals used to join the solid electrolytes 51 and 52 to the α-alumina disc 60.

The examples shown in FIGS. 1 and 2 relate to sodium-sulphur batteries having a ceramic member to close the liquid sulphur compartment, but an example of an electric cell having a metallic member will now be described.

Figure 3:
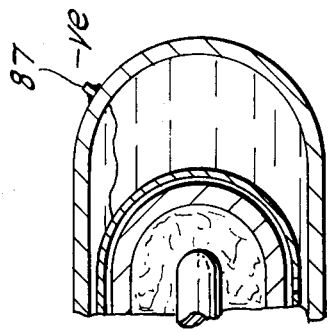
FIG. 3 is an axial sectional view of an electric cell.
Figure 3:
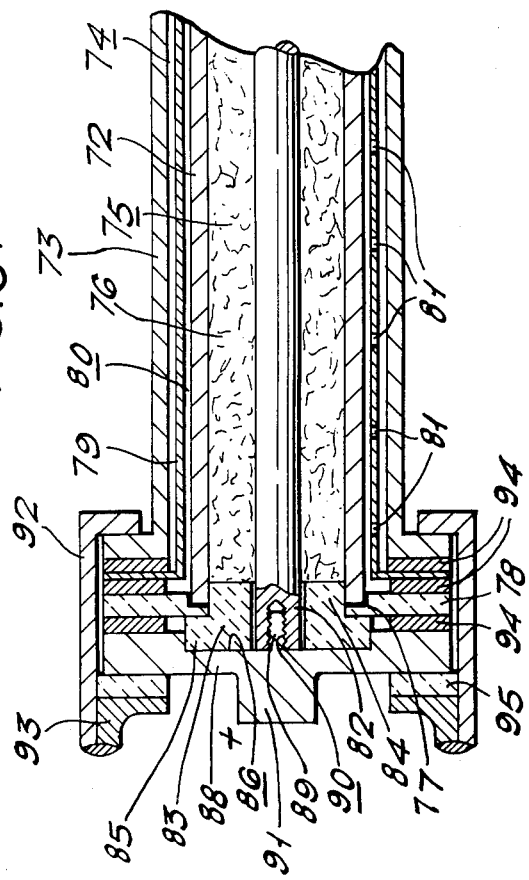

Referring now to FIG. 3, the electric cell is shown in median section and is of circular form in section; and it comprises a beta-alumina solid electrolyte 72 of blind-ended tubular form disposed within a stainless steel flanged casing 73 to define a compartment 74 therebetween for liquid sodium. A compartment 75 for liquid sulphur impregnated in a graphite felt 76 is provided inside the tubular solid electrolyte 72, a suitable distributed voidage being left within the graphite felt 76 to allow for expansion caused by the formation of sodium polysulphides when the electric cell discharges. The solid electrolyte 72 is joined at its open end by glass sealing means 77 to an alpha-alumina support flange 78. A flanged stainless steel wicking tube 79 is disposed concentrically about the solid electrolyte 72 so as to define a capillary space 80 for liquid sodium to constrain liquid sodium to flow over the surface of the solid electrolyte 72. Inlet holes 81 extending along the base of the wicking tube 79 allow flow of liquid sodium from the liquid sodium compartment 74 to the capillary space 80.

An electrode means in the form of a rod of graphite provides a current collector 82 and extends centrally along the length of the liquid sulphur compartment 75. A spacer means in the form of a flanged α-alumina spacer 83 has a spigot portion 84 which is a close fit inside the solid electrolyte 72 and provides a relatively high electrical resistance region between the solid electrolyte 72 and the current collector 82 at the open end of the solid electrolyte 72, and a flange 85 which bears against the support flange 78. A stainless steel end cap 88 closes the liquid sulphur compartment 75, and has a circular recess 86 in which the flange 85 locates, and a threaded spigot 89 which locates in a threaded hole 90 in the current collector 82. A spigot on the outside face of the end cap 88 provides a positive terminal 91, and a stainless steel spigot 87 welded to the casing 73 provides a negative terminal 87.

The cell is clamped together, using Grafoil gaskets 94 fitted between the flanged casing 73, the flanged wicking tube 79, the support flange 78, and the end cap 88, by a low alloy steel outer clamping sleeve 92 edgewelded to a low alloy steel end ring 93. An α-alumina collar 95 disposed between the end cap 88 and the end ring 93 electrically insulates them from one another.

In operation, when the electric cell discharges through an external circuit (not shown) the liquid sodium in contact with the solid electrolyte 72 is ionized with the release of electrons and forms the corresponding positive sodium ions. The electrons leave the cell through the negative terminal 87 to the external circuit, whilst the sodium ions are conducted through the solid electrolyte 72 to the liquid sulphur. The electrons from the external circuit are eventually conducted by the current collector 82 and graphite felt 76 to the liquid sulphur thereby forming sodium polysulphides with the sodium ions. That portion of the solid electrolyte 72 insulated by the spacer 83 from the graphite felt 76 and current collector 82 is substantially free from electrochemical reactions and thereby protects the glass seal 77 provided between the solid electrolyte 72 and the support flange 78 from the corrosive effect of these reactions.

During recharge of the cell a current is provided to feed electrons through the negative terminal 87 to the liquid sodium, the other lead of the charging current being connected to the positive terminal 91. The polysulphides in contact with the graphite felt 76 and the solid electrolyte 72 dissociate, and the sodium ions released flow through the solid electrolyte 72 to form sodium atoms with the electrons at the other side of the solid electrolyte 72. In the insulated region provided by the spacer 83, substantially no electrochemical reactions take place and relatively few sodium polysulphide ions migrate in that region, therefore, few sodium ions flow through that portion of the solid electrolyte 72 adjacent to the spacer 83 so that the aforedescribed adverse effects that the sodium ions can have on the glass seals is thereby obviated. The flange 85 of the spacer 83 ensures that the spacer 83 provides an elongated path therearound and reduces the likelihood of a short circuit path for migrating sodium polysulphides between the end cap 88 and the solid electrolyte 72.

Although the invention has been described in relation to the use of a spacer means, for example the insulating spacer 83, to provide a region substantially free from electrochemical reactions at one end of the liquid cathode compartment, naturally spacer means may be adapted in shape and disposed so as to provide similar regions elsewhere, for example, so as to smooth out the flow of sodium ions through the solid electrolyte at local areas subject to distortion of the flow and, therefore, of current intensification during recharge of the cell.

Although the electrode means in FIG. 3 has been described as made of graphite, it may be made from some other carbonaceous material, and may be reinforced with a metal, such as stainless steel, to provide structural strength, and similarly the spacer means may be made from alternative insulating materials such as silicon nitride provided that they are able to withstand the chemical and thermal conditions in the sulphur compartment of a sodium-sulphur cell.

We claim:

1. An electric cell comprising a solid electrolyte of blind-ended tubular form providing a compartment inside said solid electrolyte containing liquid sulphur impregnated in a graphite felt and bounding on the outside thereof a compartment containing liquid sodium, a ceramic support member of annular form joined to the solid electrolyte at the open end thereof by glass sealing means, a metallic closure member closing said liquid sulphur compartment and providing one of the terminals of the cell, a current collecting means of rod-like external form electrically connected to the closure member and supported therefrom and extending lengthwise along the liquid sulphur compartment, and a ceramic spacer means of annular form disposed concentrically in the liquid sulphur compartment adjacent to the glass sealing means and that portion of the solid electrolyte adjacent to the glass sealing means and extending beyond a portion of the solid electrolyte bounded on its other side by the extremities of the glass sealing means in the liquid sodium compartment.

2. An electric cell as claimed in claim 1, wherein the spacer means is shaped to provide a lengthened path therearound between the closure member and that portion of the spacer means immediately adjacent to the glass sealing means so as to inhibit the migration of sodium polysulphide ions thereby between said closure member and the spacer means.

3. An electric cell comprising a solid electrolyte of blind-ended tubular form bounding on the outside thereof a compartment containing liquid sodium, a ceramic support member to which the solid electrolyte is joined by glass sealing means at the open end thereof, a metallic electrode means extending lengthwise along the space inside the tubular solid electrolyte to define therebetween a compartment of annular form containing liquid sulphur impregnated in a conductive felt, a metallic closure member adapted to close the liquid sulphur compartment and to which the electrode means is electrically connected and supported therefrom, said closure member being joined to the ceramic support member by glass sealing means, and ceramic spacer means of annular form disposed concentrically in the liquid sulphur compartment adjacent to the metallic closure member and the glass sealing means and extending beyond a portion of the solid electrolyte bounded on its other side by the extremities of the glass sealing means in the liquid sodium compartment, thereby to provide a region substantially free from cathodic reactions adjacent to said closure member and the glass sealing means.

4. An electric cell as claimed in claim 3, wherein the closure member comprises a Kovar nickel/iron portion.

5. An electric cell as claimed in claim 3, wherein the ceramic support member is of disc-like form and also closes the liquid sodium compartment.

6. An electric cell comprising a solid electrolyte of tubular form having a closed end and which on one side partially bounds a compartment containing liquid sodium and on its other side partially bounds a compartment containing liquid sulphur impregnated in a conductive felt, a ceramic support member joined to the solid electrolyte at the open end thereof by glass sealing means, and an electrode means extending along the liquid sulphur compartment in spaced relationship to said solid electrolyte, wherein the improvement comprises a ceramic spacer of annular form disposed in the liquid sulphur compartment between the electrode means and the solid electrolyte, said spacer being shaped and positioned in the liquid sulphur compartment so as to keep the conductive felt away from a material likely to be adversely affected by electrochemical reactions occuring thereat and to thereby provide a region adjacent to said material substantially free from said electrochemical reactions.

7. An electric cell as claimed in claim 6, wherein the spacer is shaped to provide a lengthened path around the periphery thereof to inhibit the migration of sodium polysulphide ions therearound during recharge of the cell.

8. An electric cell as claimed in claim 6, wherein the electrode means comprises a metal tube, and a portion of said tube comprises said material.

9. An electric cell as claimed in claim 6, wherein the spacer is disposed adjacent to the solid electrolyte at the open end thereof, and extends along said solid electrolyte beyond the extremities of the glass sealing means on said one side of the solid electrolyte.

* * * * *